United States Patent
Eberlein et al.

(10) Patent No.: US 9,898,494 B2
(45) Date of Patent: *Feb. 20, 2018

(54) ZERO DOWNTIME UPGRADE FOR DATABASE APPLICATIONS USING TABLES WITH SEQUENCES

(71) Applicants: Peter Eberlein, Malsch (DE); Volker Driesen, Heidelberg (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 281 days.

This patent is subject to a terminal disclaimer.

(21) Appl. No.: 14/629,409

(22) Filed: Feb. 23, 2015

(65) Prior Publication Data

US 2016/0246832 A1  Aug. 25, 2016

(51) Int. Cl.
*G06F 9/445* (2006.01)
*G06F 17/30* (2006.01)

(52) U.S. Cl.
CPC .......... *G06F 17/30351* (2013.01); *G06F 8/67* (2013.01); *G06F 17/30297* (2013.01)

(58) Field of Classification Search
CPC ......... G06F 17/30297; G06F 17/30377; G06F 17/30351; G06F 8/67; G06F 8/65
See application file for complete search history.

(56) References Cited

U.S. PATENT DOCUMENTS

| | | | |
|---|---|---|---|
| 5,717,924 A | 2/1998 | Kawai | |
| 6,128,588 A * | 10/2000 | Chacon | G03F 7/705 703/6 |
| 6,151,608 A | 11/2000 | Abrams | |
| 6,304,882 B1 | 10/2001 | Strellis et al. | |
| 6,367,077 B1 | 4/2002 | Brodersen et al. | |
| 6,385,626 B1 | 5/2002 | Tamer et al. | |
| 6,711,593 B1 | 3/2004 | Gordon et al. | |
| 6,850,938 B1 * | 2/2005 | Sadjadi | G06F 17/30362 |
| 7,035,943 B2 | 4/2006 | Yamane et al. | |
| 7,353,231 B1 | 4/2008 | Eslambolchi et al. | |
| 7,523,142 B2 | 4/2009 | Driesen et al. | |
| 7,587,435 B2 | 9/2009 | Shepherd | |
| 7,620,665 B1 | 11/2009 | George et al. | |

(Continued)

OTHER PUBLICATIONS

Oracle. RTM. Database. JDBC Developer's Guide—12c Release 1 (12.1). Jun. 2014.

*Primary Examiner* — Jorge A Casanova
(74) *Attorney, Agent, or Firm* — Mintz Levin Cohn Ferris Glovsky and Popeo, P.C.

(57) ABSTRACT

An upgrade of a first version of a database application to a second version of a database application that both have a same data schema is initiated. The first database application has a first access schema such that at least one table in the data schema is linked to the first access schema. The second version of the database application has a second access schema such that at least one database table in the data schema is linked to the second access schema. The first access schema differs from the second access schema. Concurrent access is provided for each access schema to at least one sequence in the data schema to both the first version of the database application and the second version of the database application. Related apparatus, systems, techniques and articles are also described.

20 Claims, 14 Drawing Sheets

(56) References Cited

U.S. PATENT DOCUMENTS

| | | |
|---|---|---|
| 7,783,610 B2 | 8/2010 | Lin et al. |
| 7,818,740 B2 | 10/2010 | Bankston et al. |
| 8,200,634 B2 | 6/2012 | Driesen et al. |
| 8,229,579 B2 | 7/2012 | Eldridge et al. |
| 8,266,180 B2 | 9/2012 | Zazrivec et al. |
| 8,301,609 B1 * | 10/2012 | Dryfoos ............ G06F 17/30377 |
| | | 707/704 |
| 8,356,010 B2 | 1/2013 | Driesen |
| 8,370,828 B2 | 2/2013 | Bankston et al. |
| 8,380,667 B2 | 2/2013 | Driesen |
| 8,412,689 B2 | 4/2013 | Reid et al. |
| 8,417,737 B2 | 4/2013 | Hopmann et al. |
| 8,479,187 B2 | 7/2013 | Driesen et al. |
| 8,521,706 B2 | 8/2013 | Alpern et al. |
| 8,819,050 B2 | 8/2014 | Babka et al. |
| 8,909,610 B2 | 12/2014 | Reid et al. |
| 9,092,474 B2 | 7/2015 | Bentzien et al. |
| 9,152,659 B2 | 10/2015 | Cline et al. |
| 9,213,728 B2 | 12/2015 | Engelko et al. |
| 9,501,516 B2 | 11/2016 | Driesen |
| 9,519,675 B2 * | 12/2016 | Specht ...................... G06F 8/67 |
| 9,639,448 B2 * | 5/2017 | Gebhard ................. G06F 11/36 |
| 9,665,365 B2 * | 5/2017 | Buzsaki .................... G06F 8/67 |
| 2002/0178077 A1 | 11/2002 | Katz et al. |
| 2004/0015953 A1 | 1/2004 | Vincent |
| 2005/0138013 A1 | 6/2005 | Walker et al. |
| 2005/0251523 A1 | 11/2005 | Rajamani et al. |
| 2008/0098046 A1 | 4/2008 | Alpern et al. |
| 2008/0115134 A1 | 5/2008 | Elliott et al. |
| 2009/0019094 A1 | 1/2009 | Lashley et al. |
| 2009/0313309 A1 * | 12/2009 | Becker ............. G06F 17/30595 |
| 2010/0088281 A1 | 4/2010 | Driesen et al. |
| 2010/0153341 A1 | 6/2010 | Driesen et al. |
| 2010/0162226 A1 | 6/2010 | Borissov et al. |
| 2010/0223430 A1 | 9/2010 | Walker et al. |
| 2011/0016461 A1 | 1/2011 | Bankston et al. |
| 2011/0107135 A1 | 5/2011 | Andrews et al. |
| 2011/0246419 A1 | 10/2011 | Yancey et al. |
| 2013/0138695 A1 | 5/2013 | Stanev |
| 2013/0238555 A1 | 9/2013 | Driesen et al. |
| 2013/0238577 A1 | 9/2013 | Driesen et al. |
| 2013/0238868 A1 | 9/2013 | Driesen et al. |
| 2014/0059530 A1 * | 2/2014 | Banavalikar .......... G06F 9/4406 |
| | | 717/170 |
| 2014/0101644 A1 | 4/2014 | Buzaski et al. |
| 2014/0101646 A1 | 4/2014 | Buzaski et al. |
| 2014/0101650 A1 | 4/2014 | Buzaski et al. |
| 2014/0114913 A1 | 4/2014 | Engelko et al. |
| 2014/0143284 A1 | 5/2014 | McCaffrey |
| 2014/0164425 A1 | 6/2014 | Gruenhagen et al. |
| 2014/0258343 A1 | 9/2014 | Nikula |
| 2015/0074140 A1 | 3/2015 | Hutzel et al. |
| 2016/0070751 A1 | 3/2016 | Clifford et al. |
| 2016/0085777 A1 | 3/2016 | Engelko et al. |

* cited by examiner

ZERO DOWNTIME UPGRADE FOR DATABASE APPLICATIONS USING TABLES WITH SEQUENCES

TECHNICAL FIELD

The subject matter described herein relates to the use of tables of sequences with the zero downtime upgrade of database applications.

BACKGROUND

Deployment of maintenance packages to computing platforms often require downtime of such platforms. At the beginning of downtime, a backup is created and this backup serves as a fallback option, in case the upgrade fails. Advancements in technology have enabled for reduced, and in some cases, minimal downtime upgrades. With such arrangements, upgrades run in parallel to a production system within the same database for the complete duration of the upgrade. The upgrade procedure creates clones of the tables, which are changed by the upgrade and runs database triggers to replicate data from production to the upgrade copy of the tables.

However, such upgrade procedures are not well equipped to handle tables as they can result duplicate numbers in the fields where the usage of the sequence should create a unique number in each field. Further, with upgrade procedure, there can be upgrade reports, which copy data from the old to the new table which must preserve sequence field values. In parallel, there can be inserts into the new table of new data which much use the next value of the sequence to insert new rows. With such an arrangement, there must be one sequence that is used for the old table and the new table.

SUMMARY

In one aspect, an upgrade of a first version of a database application to a second version of a database application that both have a same data schema is initiated. The first database application has a first access schema such that at least one table in the data schema is linked to the first access schema. The second version of the database application has a second access schema such that at least one database table in the data schema is linked to the second access schema. The first access schema differs from the second access schema. Concurrent access is provided for each access schema to at least one sequence in the data schema to both the first version of the database application and the second version of the database application.

Concurrent access can be enabled by a respective at least one sequence pointer in each of the first access schema and the second access schema. Concurrent access can be enabled by a field in a respective at least one table in each of the first access schema and the second access schema. Each of the first access schema and the second access schema can include a table pointer to the at least one database table in the data schema.

Each access schema can be provided with concurrent access to at least one database table in the data schema to both the first version of the database application and the second version of the database application. This concurrent access can be enabled by a respective at least one table link object in each of the first access schema and the second access schema that is used by database views or stored procedures such access schema. The at least one database table in the data schema is updated to reflect changes in a corresponding table link object using at least one application trigger associated with the at least one table link object. There can be a first application trigger in the first access schema on the first table link and a second application trigger in the second access schema on a second table link. Only the first application trigger can be called if the table in the data schema is updated through the first table link object in the first access schema and only the second application trigger can be called if the table in the data schema is updated through the second table link object in the second access schema.

The at least one table link can specify a select field list of the at least one table in the data schema. The list of fields specified by the table link object can be smaller than the list of fields of the table. The at least one table link object can be used by a database object that cannot use a database view. At least one of the table link objects can specify a calculated field. The calculated field can be transient. The at least one table link object can reference a table in the data schema that specifies a calculated field.

The database application can be executed using an in-memory database system.

Non-transitory computer program products (i.e., physically embodied computer program products) are also described that store instructions which, when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, with the current subject matter, new software is deployed in parallel to old software while, at the same time, as much persistency as possible is reused. Such an arrangement provides an in-place upgrade in which, if the upgrade writes to persistency, either due to content delivery or due to data migration activities, the data for the respective database tables is duplicated. This approach minimizes the additional memory consumption during the upgrade procedure as compared to conventional techniques while, at the same time, avoiding duplicate records.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter enables revocation of zero downtime upgrades by providing a procedure on the same level as the upgrade deploy tool, which executes steps, revoking actions of the initial deployment on a database table level. Various types of zero downtime maintenance/upgrade procedures can be utilized such as that described in U.S. Pat. App. Pub. No. 20130238555 entitled: "Aliases for accessing shared tables during provision of continuous access during application upgrade" and in U.S. Pat. App. Pub. No. 20130238868 "Using temporary system to provide continuous access during application upgrade", the contents of both of which are hereby fully incorporated by reference. As will be described in further detail below, if a table is populated during the upgrade, the upgrade procedure creates a copy of the table, installs a database trigger to replicate all changes done by production from the production table to the upgrade's copy. At the end of the upgrade, the access of production is switched to the target table.

Figure 1:
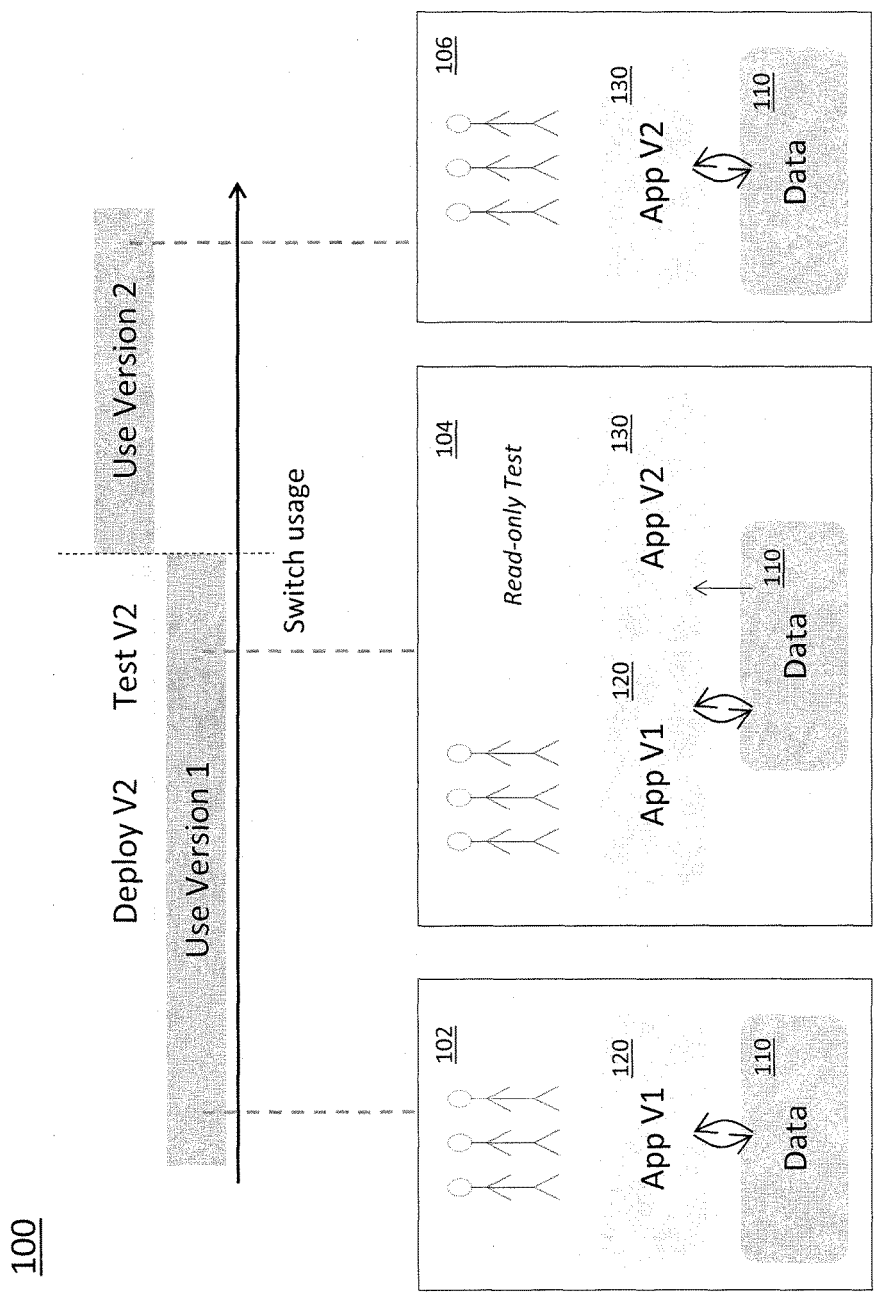
FIG. 1 is a process flow diagram illustrating phases of a zero downtime upgrade.

FIG. 1 is a diagram 100 illustrating an approach to deploy an upgrade across three separate phases 102, 104, 106 with zero downtime. Initially, in the first phase, an application version 1 (V1) 120 as part of its operations performs read and writes on a database 110. Thereafter, in a subsequent phase 104, a second version of the application (application V2 13) is deployed and tested. During such testing, the interaction of application V2 130 with the database 110 can be limited to read only testing (as opposed to being able to perform both read and write operations on the database 110). Once the testing of application V2 130 has been completed, a switchover can be performed, in phase 106, in which application V2 130 is the sole application interacting (via read and write operations) on the database 110. In some cases, the switchover can be accomplished with zero downtime (i.e., there is always one application executing on the database 110).

Figure 2:
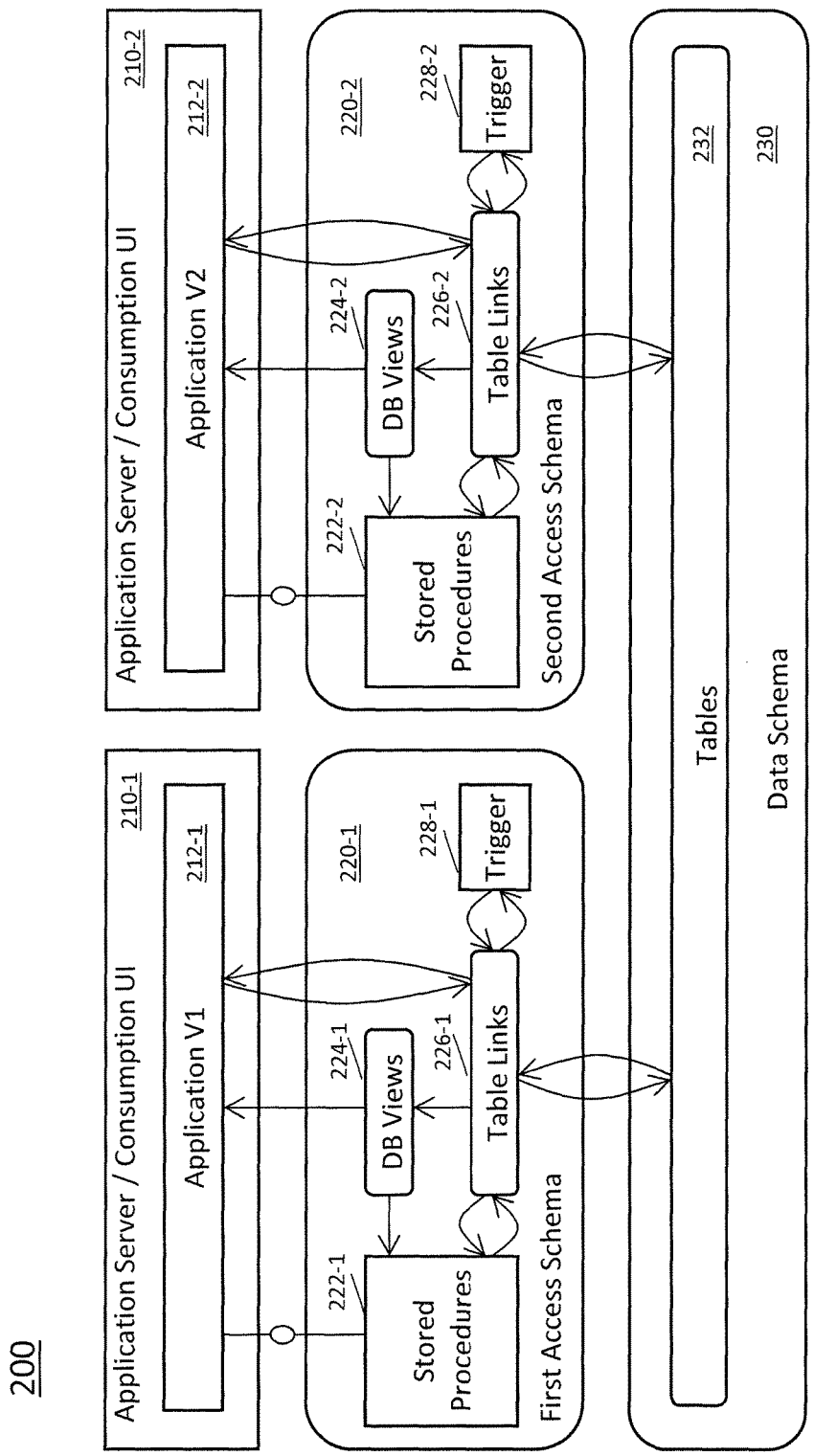
FIG. 2 is a system diagram illustrating a zero downtime upgrade using table links.

With reference to diagram 200 of FIG. 2, the general idea of an in-place upgrade procedure is to deploy the software twice, while, at the same time, keeping the main part of the data in a single representation. The only data that can be held in two representations is that data which is changed by the upgrade—either due to content deployment or due to structure changes of the database tables (duplicates are not needed for new fields).

Two versions of application software 212-1 and 212-2 can be accessed, for example, on a client via a respective application server/consumption user interface (on a client device) 210-1, 210-2. In order to main data mainly as a singleton (i.e., a single representation), while being able to deploy the software twice (via application version 1 212-1 and application version 2 210-2), the deployed software (application V1 212-1 and application V2 212-2) can access underlying data in tables 232 in a data schema 230 (or in some cases multiple data schemas) by using different database access schemas 220-1, 220-2. Within some database systems (e.g., an in-memory database such as the HANA platform offered by SAP SE), not only can database tables be used, but also database views 224-1, 224-2, stored procedures 222-1, 222-2 (subroutines available to applications that access a relational database system, etc.), scripts and the like. All of these elements can be created in an access schema 220-1, 220-2 which can, as an analogy, acts as a proxy/interface to the underlying data stored in the tables 232 in the data schema 230. The data stored in tables 232 can be stored in the data schema 230 and can be published to the respective access schema 220-1, 220-2 holding the application code and views via a table link 226-1, 226-2 (as described in further detail below). The database views 224-1, 224-2 are results sets of stored queries on the data in the tables 232 which the server/users 210-1, 210-2 can query just as they would in a persistent database collection object.

During an upgrade, a second access schema 220-2 is created. Then, the tables 232 can be exposed to this second access schema 220-2 via a new table link 226-2, the views 224-2 can be created and the software for application V2 212-2 can be deployed. During deployment of the new application V2 212-2, the tables 232 can be set to read only access for the second access schema 220-2. If the database tables 232 need to be written to or structurally changed by the upgrade, the database tables 232 can be copied and the copy can be exposed to the second access schema 220-2 under its original name.

The table link 226-1, 226-2 can be a database object type that is either standalone or it can be an attribute for an existing database view or database synonym/alias. The table links 226-1, 226-2 can be created in each access schema 220-1, 220-2 and can be consumed by some or all database objects in the access schema such as calculation views, analytical views, stored procedures, database triggers, database built in functions (e.g., calculation engine functions, etc.) like unit conversion or quantity conversion or calendar functions and other objects.

The table links 226-1, 226-2 can each act like a view to the database tables 232 allowing only "to select" operations from one table (while omitting data fields and not omitting key fields). There can be different types of table links 226-1, 226-2, for example, there can be a table link type for row tables and one for column tables. The name of the table links 226-1, 226-2 and the names of the table can differ. In order to allow adding new fields to a table without needing to clone it, a field list can be defined which can be exposed by the table link 226-1, 226-2 such that only data fields can be omitted. If an update happens to the table link 226-1, 226-2 and a data field is not available in the table link but in the table, the field in the table shall be updated with a database default value for the field. In other words, the table links 226-1, 226-2 can be characterized as synonyms with the option to specify the selected fields as in a view.

Updates to the table links 226-1, 226-2 by the applications 212-1, 212-2 can cause the table links 226-1, 226-2 to update the database table 232. In addition, the table links 226-1, 226-2 can fill fields in the database table 232 that are not referenced with default values. Select for update on the table links 226-1, 226-2 can be executed on the table 232 so that entries there are locked.

The table links 226-1, 226-2 can additionally allow for the definition of triggers 228-1, 228-2 (when associated with table links they are referred to herein as application triggers). The application triggers 228-1, 228-2 associated with the table links 226-1, 226-2 can be objects encapsulating procedural code that can be automatically executed in response to certain events on the table links 226-1, 226-2. The table links 226-1, 226-2 can also allow for the generation of calculated fields (as will be described in more detail below).

Figure 3:
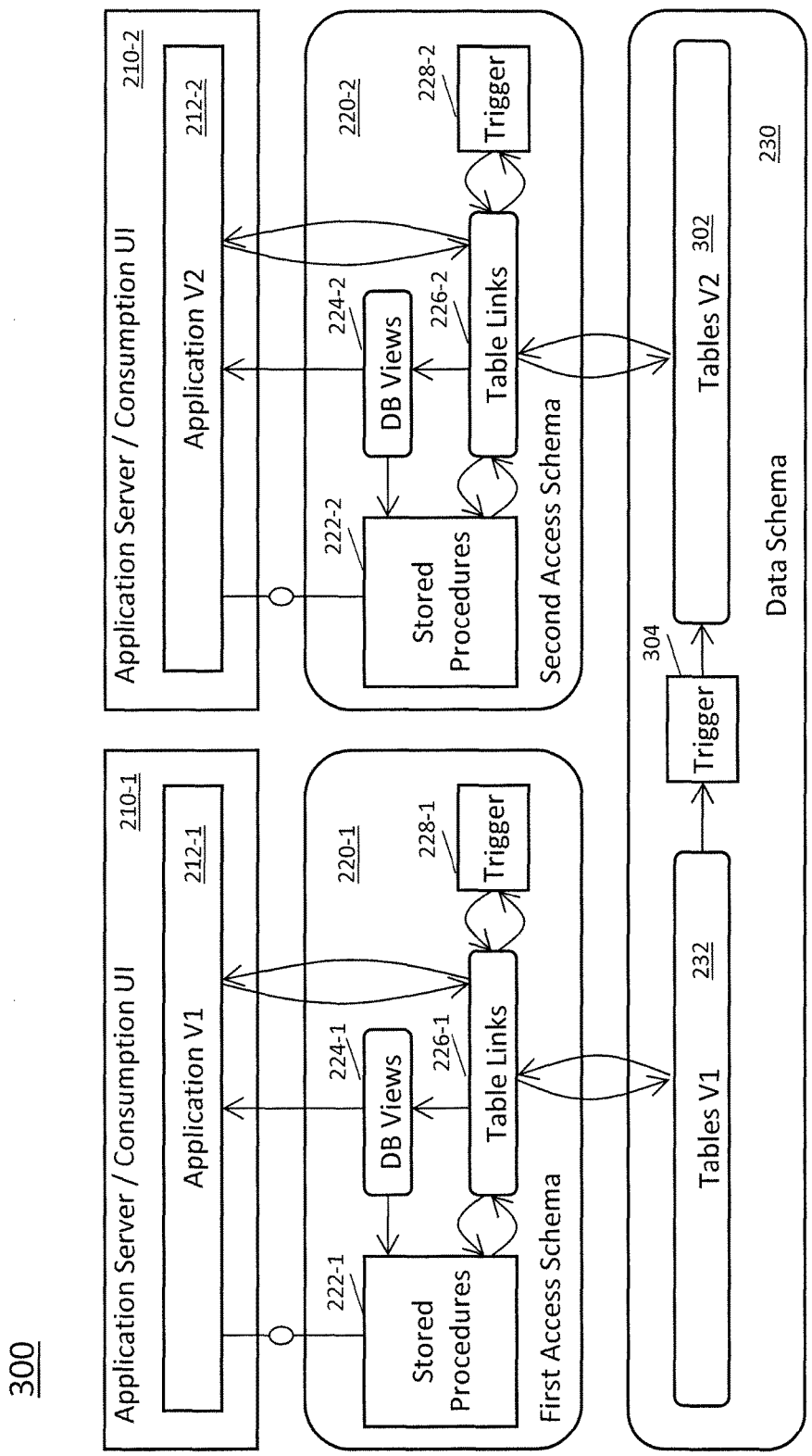
FIG. 3 is a system diagram illustrating a zero downtime upgrade using table links and cloned tables.

As part of a zero downtime upgrade, application triggers 228-1, 228-2 can be created on the table link 226-1, 226-2 in the respective access schema 220-1, 220-2 instead of creating them on the database tables 232 in the data schema 230. The application triggers 228-1, 228-2 can act to only fire for updates for the table links 226-1, 226-2 in the access schema 220-1, 220-2 in which it was created. Further, in some cases, an application trigger 228-1, 228-2 can be created for the table link 226-1, 226-2 and a database trigger 304 (see diagram 300 of FIG. 3) for tables 232, 302.

Application triggers 228-1, 228-2 have to be created in the access schema 220-1, 220-2, as this way, they can be updated to a new version easily and the application triggers 228-1, 228-2 can call stored procedures 222-1, 222-2 in the corresponding schema 220-1, 220-2 and access all other database objects locally in the schema 220-1, 220-2.

During the upgrade, two application triggers 228-1, 228-2 can be deployed: the application version 1 trigger 228-2 is active in the first access schema 220-1 and the application version 2 trigger 228-1 is active in the second access schema 228-2. If an update is done in the first access schema 220-1 on the table link 226-1, the application trigger 228-1 in the first access schema 220-1 shall fire, but not the trigger in the second access schema 220-2 and vice versa.

In this scenario, the upgrade procedure may also define triggers 304 in the data schema 230 on the database tables to populate new fields. During an upgrade, there can potentially be a clone of the table (so that there are tables V1 232 and tables V2 302). The clone process can be done with a database trigger 304. In this arrangement, there can be application triggers 228-1, 228-2 in the access schemas 220-1, 220-2 defined by the application and database triggers 304 in the data schema 230 defined by the upgrade procedure. These database triggers 304 can execute the updates done to the original table (table V1 232) also on the copy table (table V2 302).

In this case (as illustrated in diagram 300 of FIG. 3), an update to table link 226-1 in the first access schema 220-1, can trigger the corresponding application trigger 228-1 as well as the database trigger 304 in the data schema 230.

Figure 4:
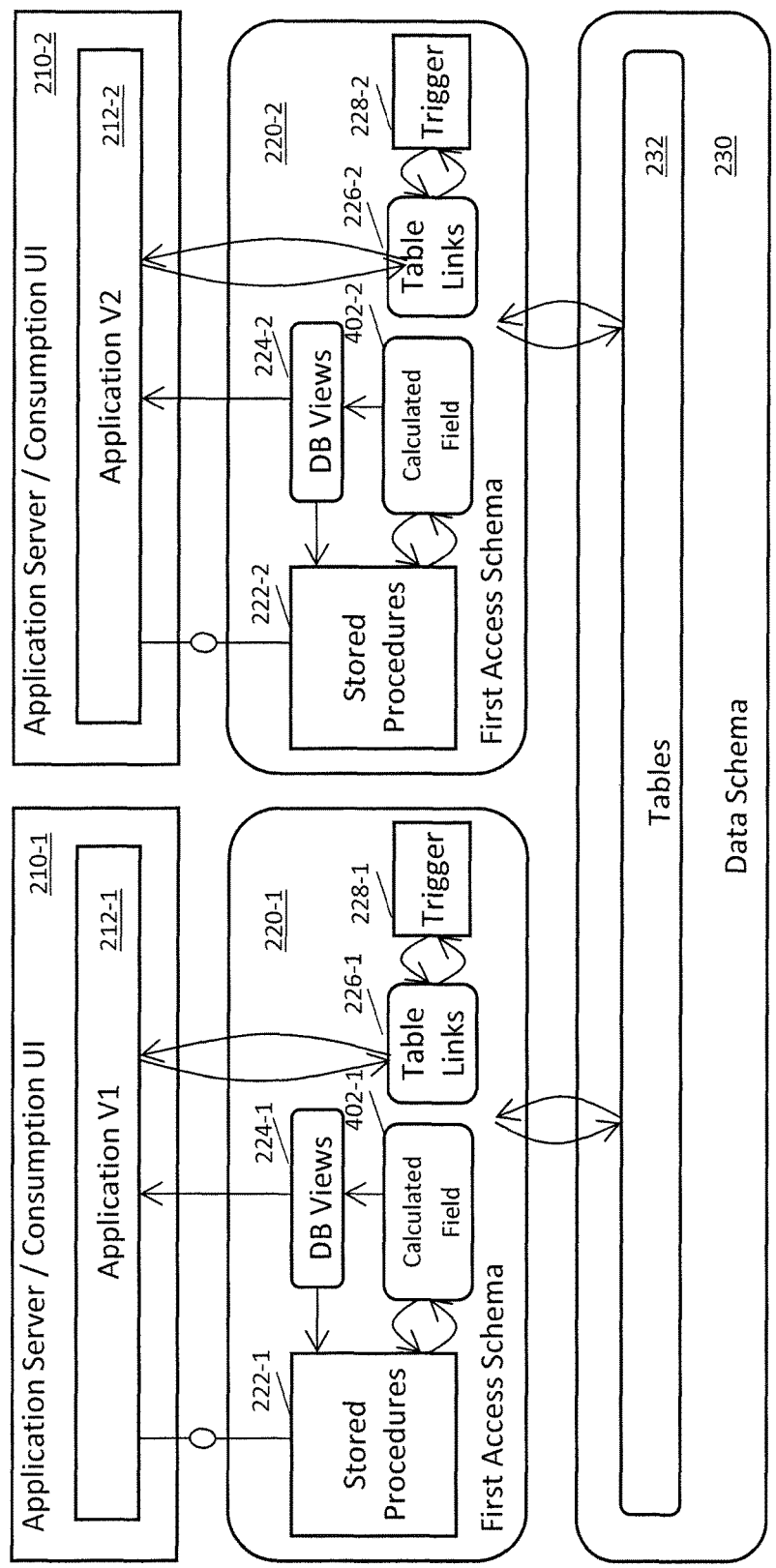
FIG. 4 is a system diagram illustrating a zero downtime upgrade using table links and transient calculated fields.
Figure 5:
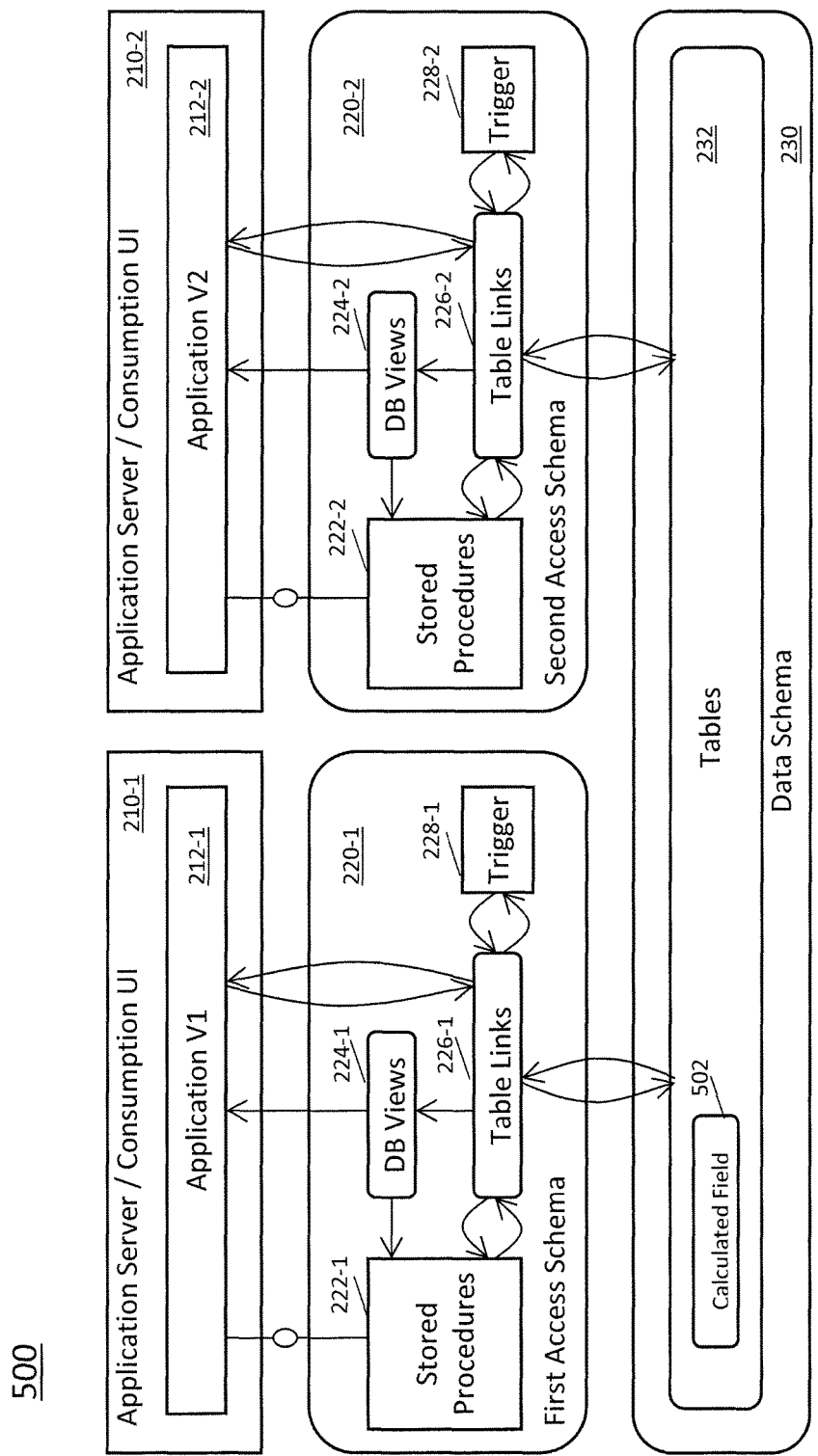
FIG. 5 is a system diagram illustrating a zero downtime upgrade using table links and persisted calculated fields.

Still further, calculated fields can be provided. For example, with reference to diagram 400 of FIG. 4, transient calculated fields 402-1, 402-2 can be defined in the access schemas 220-1, 220-1. In addition, as described below in connection with diagram 500 of FIG. 5, persisted calculated fields 502 can be defined in the data schema 230.

A transient calculated field 402-1, 402-2 is not persisted in the database tables 232. The values for the calculated field 402-1, 402-2 can be computed upon select. With the current subject matter, a transient calculated field 402-1, 402-2 can be defined only on the corresponding table links 226-1, 226-2, not on the tables 323 in the data schema 230. This arrangement allows for the changing of calculated field logic in a new software release without the need to copy the complete table 232. Further, this approach can also enable the calculated field 402-1, 402-2 to call custom code deployed as a stored procedure.

If the field is persisted, the situation is different. The calculated field 502 (i.e., field value) can be stored in the data schema 230. This can be defined by the statement "GENERATED ALWAYS AS <expression>" in the database table create statement. The expression to create the field value may in this case not call external database code as such code can only be deployed once (in the data schema 230).

If such a persisted calculated field 502 is changed—a new expression can be defined and delivered with the upgrade—the database table 232 needs to be cloned to create the new field with the content computed along the new statement in a cloned table 302. In this case, the database trigger 304 may not write to the calculated field 502 but, rather, the table logic can compute the field content.

With the current subject matter, a single sequence can be used for the cloning procedure. The description below and FIGS. 6-12 address how data is copied, inserted, and sequences can be used and altered to create a consistent table clone. In general, a database (DB) sequence object can store the sequence in the data schema and expose it to the access schema (e.g., schema V1 or schema V2 in FIG. 6, etc.) via a sequence link or sequence pointer. For most databases, a synonym can also provide similar functionality. With this approach, the code deployed to the access schema can access the sequence locally in the schema and does not need to specify the data schema.

Figure 6:
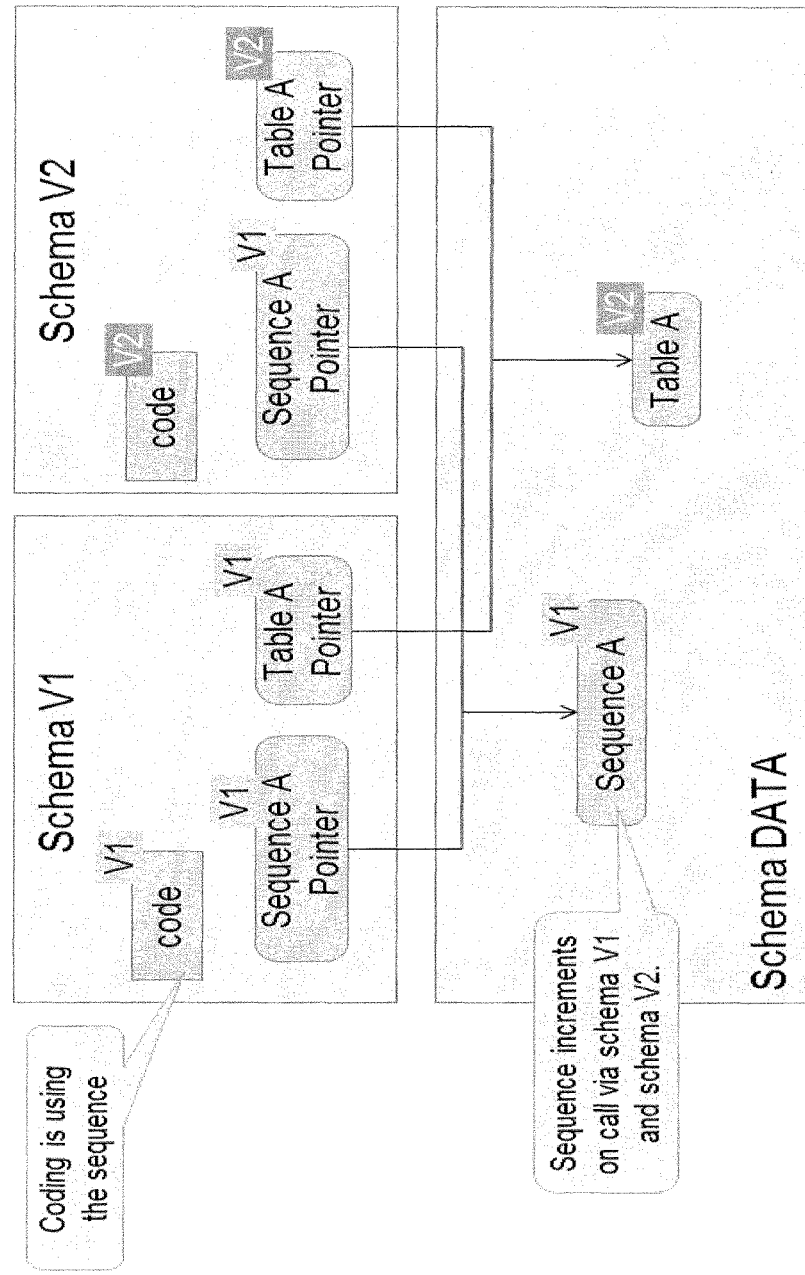
FIG. 6 is a system diagram illustrating a data schema having a sequence accessed by pointers in each access schema.

FIG. 6 in particular, illustrates two access schemas V1 and V2 which code is using a sequence A in a data schema. The sequence A is accessed by respective sequence A pointers in each access schema V1, V2. Further each access schema V1, V2 can include a table A pointer that points to a table A in the data schema.

In variations in which there is a cross-schema access for tables that are not copied, the sequence can be referred to as SEQUENCE_A and can be created in schema SCHEMA_DATA. The sequence link can be created in schema SCHEMA_ACCESS_X: create sequence_link SEQUENCE_A for SCHEMA_DATA.SEQUENCE_A. The code deployed to SCHEMA_ACCESS_X can then call SEQUENCE_A.NEXT_VAL to get the next value and does not need to specify the schema.

New software can be deployed to schema SCHEMA_ACCESS_Y. First, the sequence and tables can be made visible there with the links: create sequence_link SEQUENCE_A for SCHEMA_DATA.SEQUENCE_A. Then the code can be deployed. In the code, the sequence can now be called in the new code as SEQUENCE_A.NEXT_VAL.

Both, a call from SCHEMA_ACCESS_X and SCHEMA_ACCESS_Y increase the sequence current value. As both schemas use the table object, the same table can be written and it can be ensured that no duplicate values are written to the table.

Figure 7:
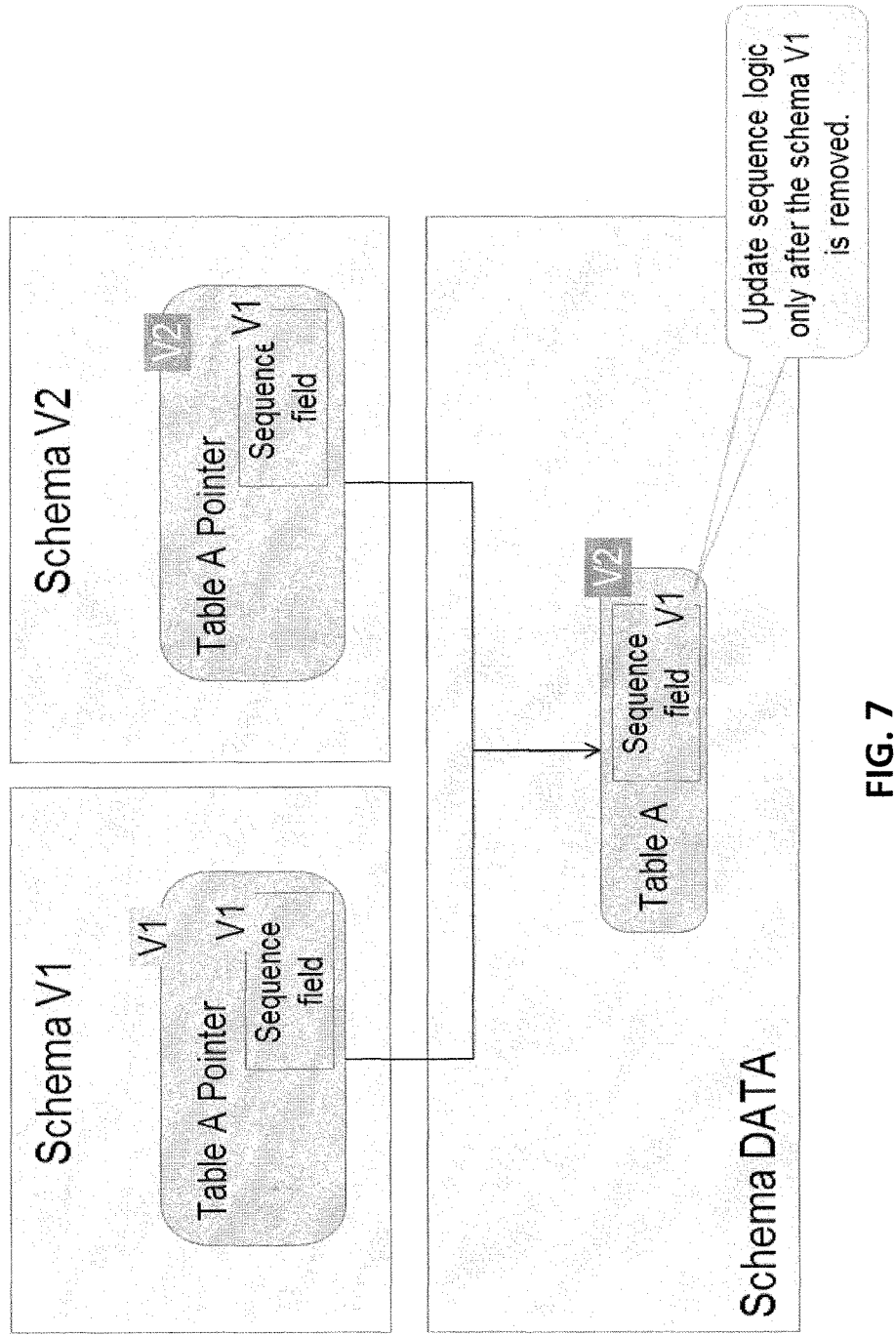
FIG. 7 is a system diagram illustrating a data schema having a table with a sequence field accessed by table pointers in each access schema.

FIG. 7 is a diagram 700 that provides a variation in which if the table is created with a generated field, the sequence field can be part of table A in the data schema and can be exposed to the access schema (via a sequence field in responsive table A pointers). An update to the table in schema V1 and in schema V2 will increase the same sequence current value such that no duplicates can be created. The sequence logic in the data schema Table A can be updated after access schema V1 has been removed.

In some cases, table cloning can be implemented using an external sequence. There can be three main operations to prepare the target table in such cases. First, the table is cloned. Second, the data is maintained in synchronization between the old table and the new table. Third, the new data is inserted into the new table (i.e., the target table).

For the clone process, a new table is created (e.g., A_new), a trigger is installed to record changes (which causes the data to be synchronized), and the complete data is transferred. The batch process can copy the existing data from Table A to A_new. The fields, which were created using the sequence for table A, are set explicitly when copied to A_new, no new sequences are calculated.

The trigger installed in the previous setup can ensure all actions done on table A are also done to table A_new. The trigger can copy new data that is inserted into A to A_new. The field, which was created using the sequence for table A, can be set explicitly when copied to A_new so that no new sequence is calculated.

Figure 8:
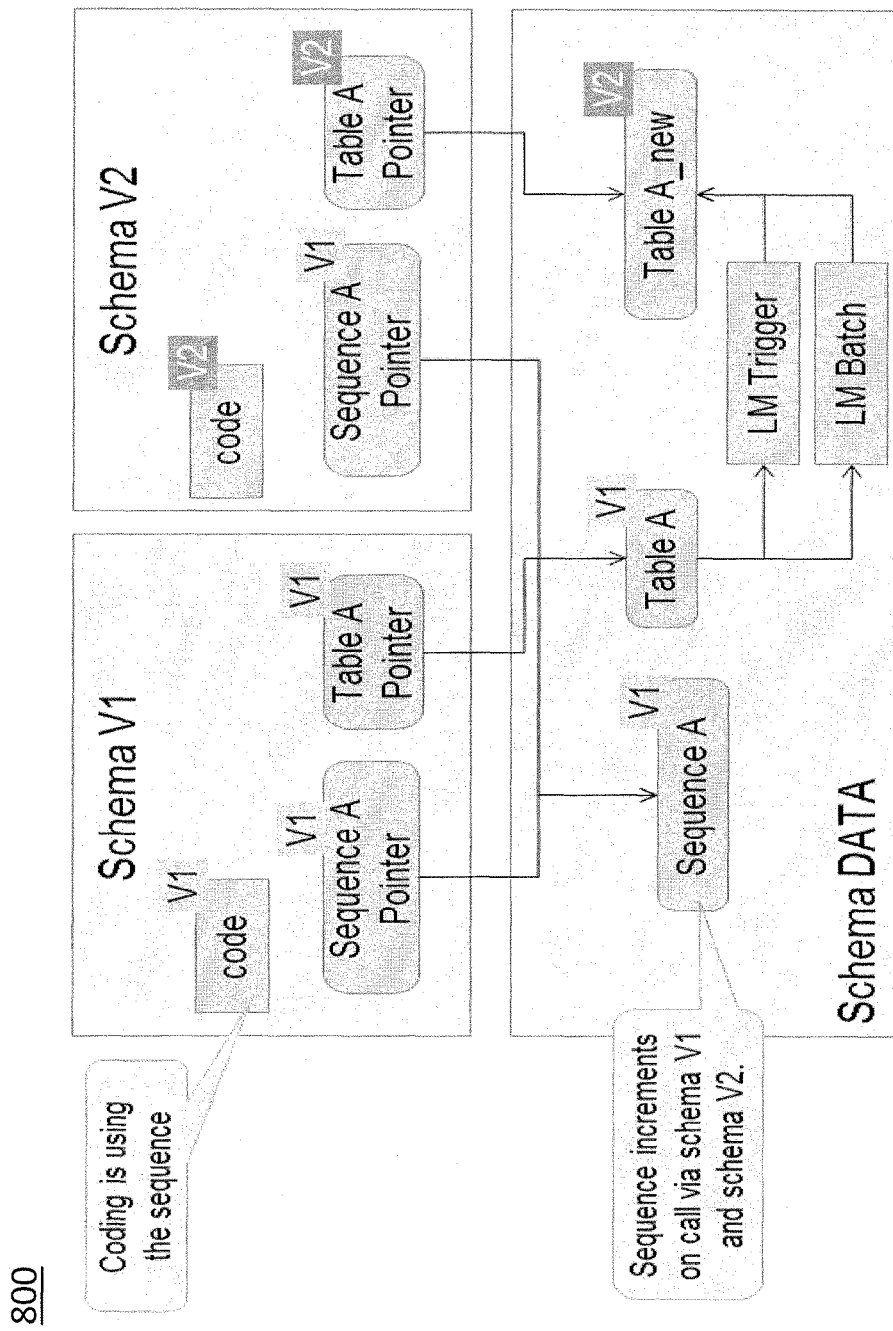
FIG. 8 is a system diagram illustrating a data schema having a sequence accessed by pointers in each access schema in which a table is updated in the data schema.

With reference to diagram 800 of FIG. 8, the new software version deployed to schema V2 may also bring data to the table A. As the old software in schema V1 may not see the data deployed for schema V2, the data is written to the table-pointer A in schema V2. This insert writes to table A_new in the data schema. A trigger and batch can be used as part of the migration process from table A to table A_new.

For an insert, the field value being calculated by the sequence can be done using the sequence pointer in schema V2. As the sequence-pointer points to the same sequence as the pointer in schema V1, both operate on the same sequence and the sequence written to table A and table A_new are thus consistent. A new sequence number can be created when an insert is done to table A_new as this will increment the current value of the sequence and a later insert to schema V1 will use the next higher value, if this set is then copied by the trigger to table A_new (it is therefore ensured that there are no duplicate values in table A_new).

A field can be defined as "always created as identity . . . " or "by default created as identity . . . ". In order to be able to copy existing records to a new table during an upgrade procedure while keeping sequence fields unchanged, the option "always created as identity . . . " cannot be used. Either, this option is completely forbidden for application development or it needs to be changed to "by default created as identity . . . " for the upgrade (and set back when the upgrade is completed).

An insert into a table having such a field can generate a new sequence number and store it in the field. The next insert will generate the next sequence number and insert, and so on. These numbers are unique.

Below is an example for SAP HANA: for the field:
GENERATED {ALWAYS|BY DEFAULT} AS IDENTITY
   [(<sequence_option>)]
<sequence_option>={<sequence_parameter_list>|RESET
   BY <subquery>|
<sequence_parameter_list> RESET BY <subquery>}
<sequence_parameter_list>::=<sequence_parameter>[{,
   <sequence_parameter>} . . . ]
<sequence_parameter>::=START WITH
   <start_value>|INCREMENT BY <increment_value>
   |MAXVALUE <max_value>|NO MAXVALUE|MINVALUE <min_value>|NO MINVALUE
   |CYCLE|NO CYCLE|CACHE <cache_size>|NO CACHE RESET BY <subquery>

To apply the same approach as described for external sequences, various options can be considered.

In one option, the database capabilities of identity fields can be extended by referencing an identity field of another table. By extending the database to allow for the referencing of an identity field of another table (in another schema) when creating a new table that includes an identity field, both tables can operate using the same sequence. This arrangement results in effectively the same situation as with an external sequence, therefore the solution in this case would be similar to that described above.

Figure 9:
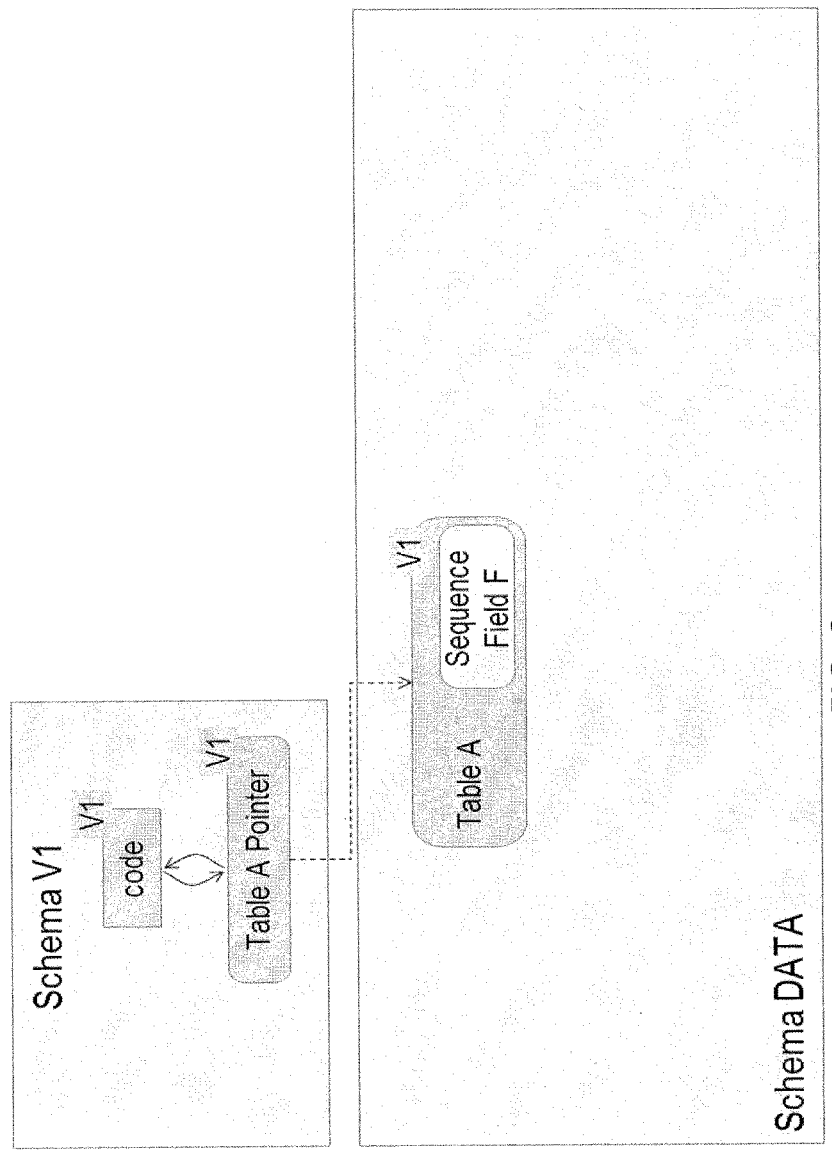
FIG. 9 is a diagram illustrating use of a database sequence object during an upgrade procedure.

In an option as illustrated in diagram 900 of FIG. 9, a database sequence object can be used during the upgrade procedure. In particular, in order to obtain joint sequence in the identity fields of tables A and A_new can be by externalizing the sequence during the upgrade. The table is A and the field using the sequence is F.

Figure 10:
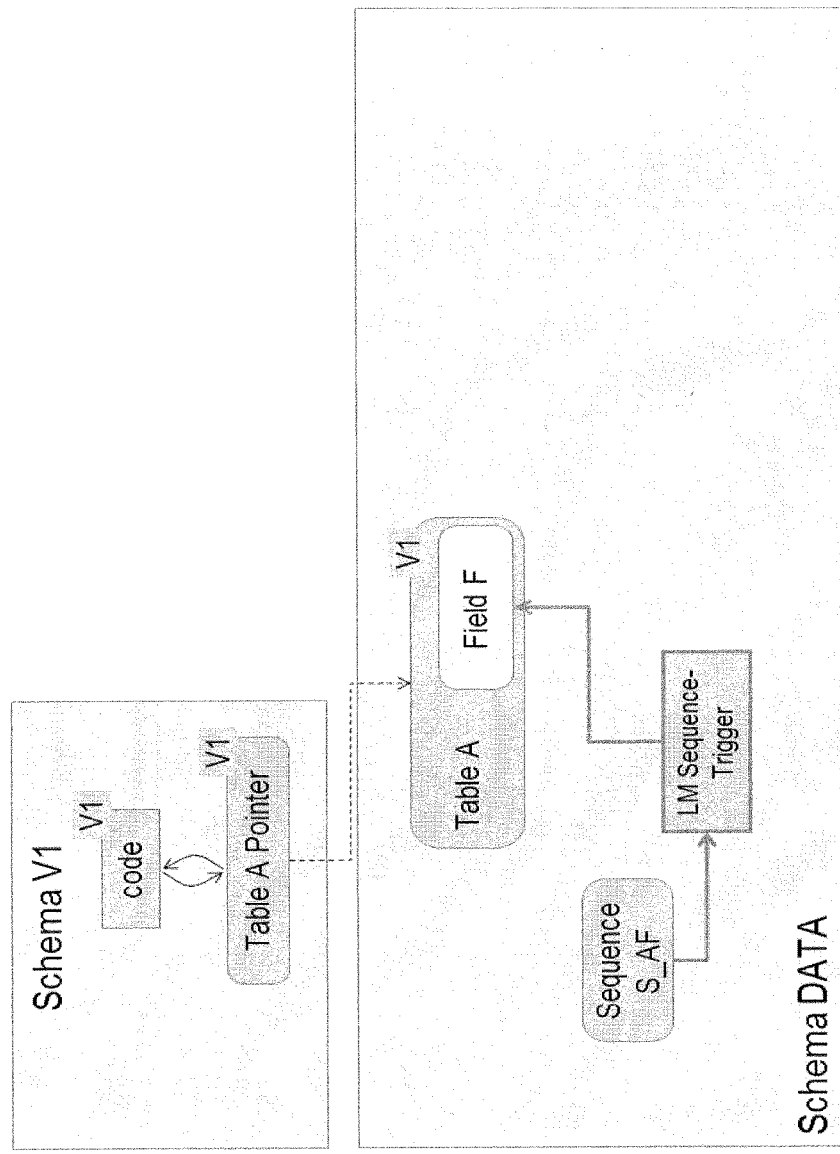
FIG. 10 is a diagram illustrating use of an external sequence in a database transaction.

The approach can be to alter the table A as illustrated in diagram 1000 of FIG. 10. In particular, the change to using an external sequence can be run in one database transaction. This can be accomplished by (i) creating an external sequence S_AF with the same parameters and as current value the next value of the sequence field, (ii) altering the table to change the sequence field F from being computed to a normal field with the same type (e.g. integer or bigint, etc.), and (iii) creating a trigger on the table A for insert. This trigger shall get the sequence S_AF.NEXT_VAL and write this data to the field F of the table. This combination should give the same results as an internal sequence field.

Figure 11:
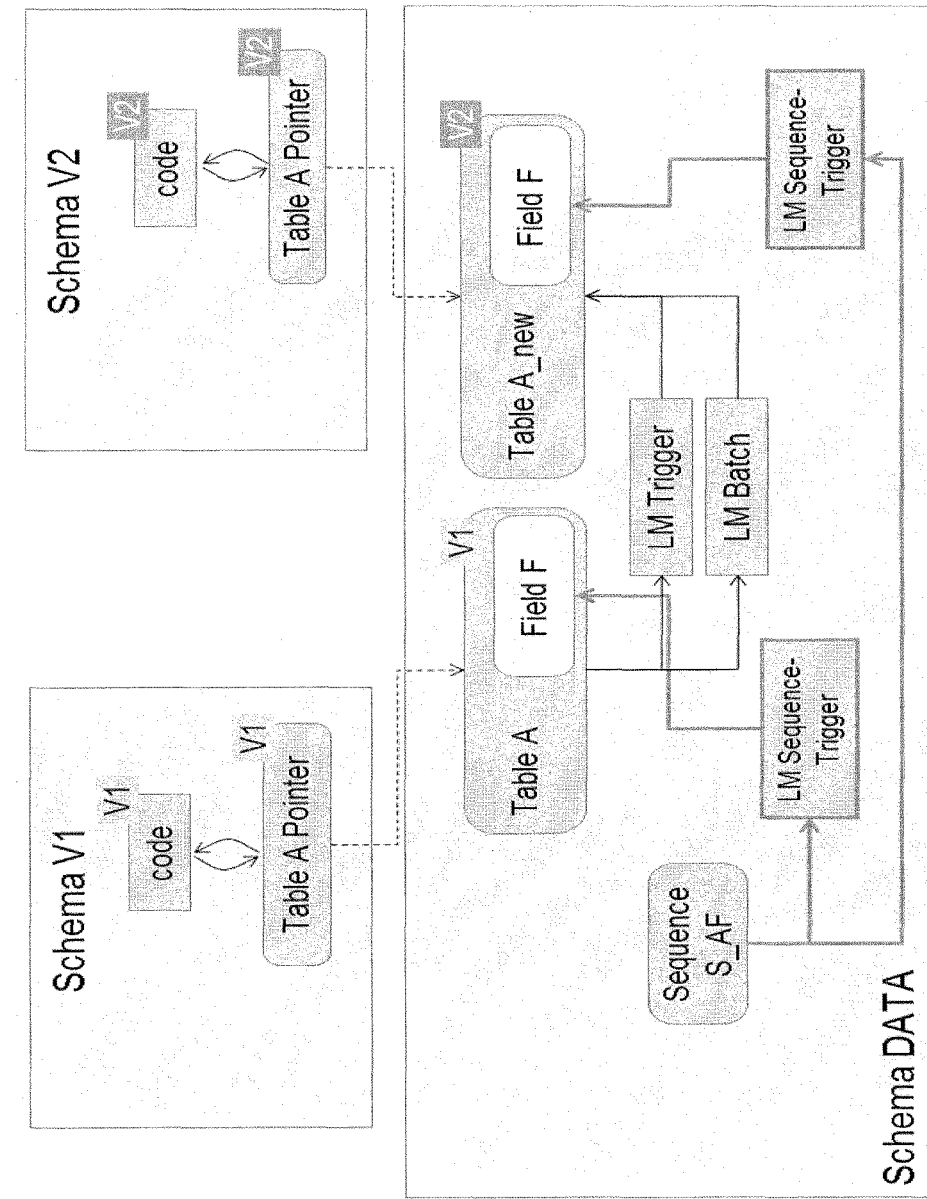
FIG. 11 is a diagram illustrating use of an external sequence in a database transaction in which a table is updated in the data schema.

With reference to diagram 1100 of FIG. 11, a new table A_new can be created using the external sequence. This new table A_new can be generated by creating a trigger on the table A_new for inserts. The trigger can identify which process is writing: the old software via schema V1, the new software via schema V2 or the lifecycle (LM) process running in the data schema. This can be done, for example, according to database user. The trigger does not act, if the LM process writes to the table A_new. The trigger can act, if the process in V2 writes. (The process in schema V1 cannot write to A_new.) If an insert is done in schema V2, the trigger can call the sequence to get a sequence value: S_AF.NET_VAL. This value is then inserted into the field.

Thereafter, the copy and the trigger process can be run to copy the table content (which does not create new sequence field values). Next, the import process can be run to deploy the new data to A_new through V2 (which also does not create new sequence field values). At some point, the application in V1 is stopped. Then the application in V2 can then start operation.

Figure 12:
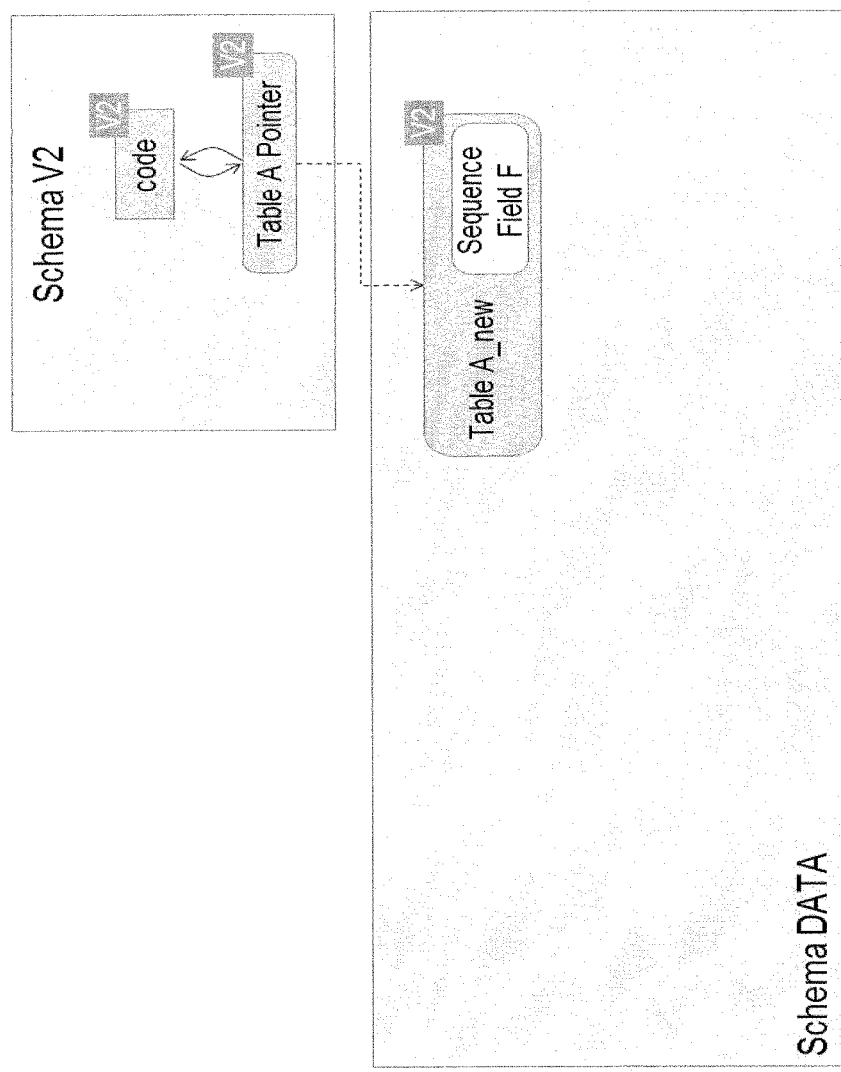
FIG. 12 is a diagram illustrating in which a new table can be altered to revert externalization of a sequence introduced for an upgrade.

Then, with reference to diagram 1200 of FIG. 12, table A_new can be altered to revert the externalization of the sequence introduced for the upgrade. As part of a single database transaction, the field F can be altered to a generated field. The sequence parameters can be as in the table definition. The current value can be initialized by the next value of the external sequence S_AF. Also as part of the single database transaction, the trigger on A_new can be dropped and the sequence S_AF can be dropped. Then, the target definition is reached.

Figure 13:
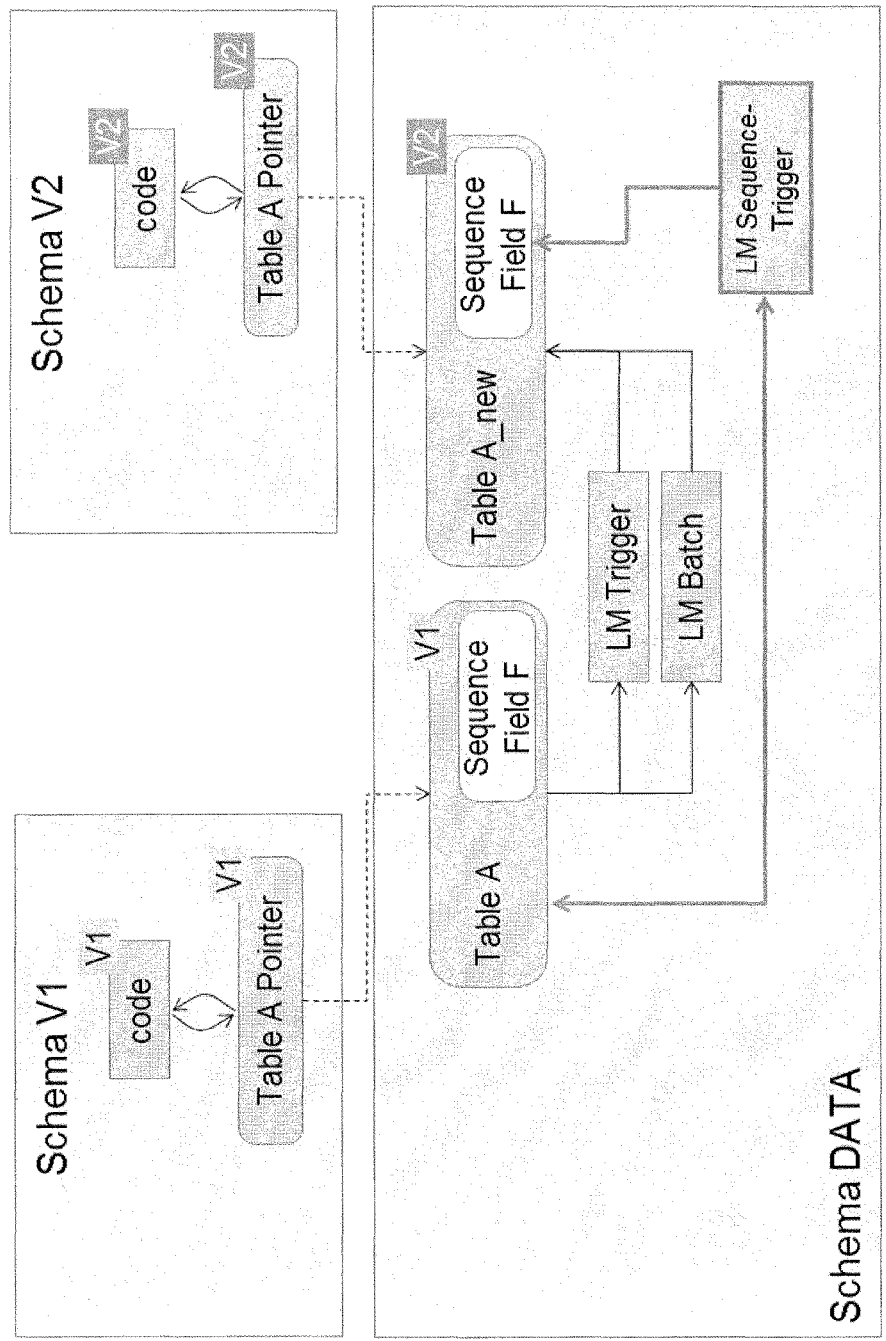
FIG. 13 is a diagram illustrating an arrangement in which sequence numbers for a new table are created using a field in the table.

Diagram 1300 of FIG. 13 illustrates a variation in which the sequence numbers for A_new can be created using field F in table A. With this variation, the target table A_new is created by having the table get the field F as defined "generated as", but not defined with "always" but with "by default" to enable setting the field value by the code writing the data. Next, a trigger can be created for the table A_new for inserts. The trigger can distinguish inserts via V2 app code and LM triggers and LM batches. The trigger can only act on inserts done by the deployment of new content via V2, not for inserts done by LM trigger and LM batch.

The trigger can create a new value for F and insert it into the field by: (i) inserting a data set into an empty key into table A, (ii) reading the data set so that field value F has a new sequence value, and (iii) deleting the data set from table A. The schema V2 can be created with the table pointer and the target software version.

The LM trigger can be created for the transfer of changes from table A to table A_new. The LM trigger can be extended compared to the usual copy trigger in the way that inserts done by the LM sequence trigger are not copied. This can be achieved, for example, by using different database users for the software in V1 and V2 and the LM process in schema DATA. In one option, after the insert/deletes can be replicated and/or insert/rollback can be used. In addition, the trigger can insert into F, the value read from A.F. and no new sequence number is created. Further, the LM sequence trigger does not fire.

A batch process can cause all data from Table A to be copied to Table A_new. The batch process can insert into F the value(s) read from A.F. and no new sequence number is created. Further, the LM sequence trigger does not fire. This latter approach can be advantageous for users of the tables in V1 and V2 in that there is only a small chance that the inserted data set interferes with operation on V1. This situation can be bypassed, if the data set is inserted, read and rollbacked (dependent on the database capabilities, if this still creates unique sequence values or not.

Figure 14:
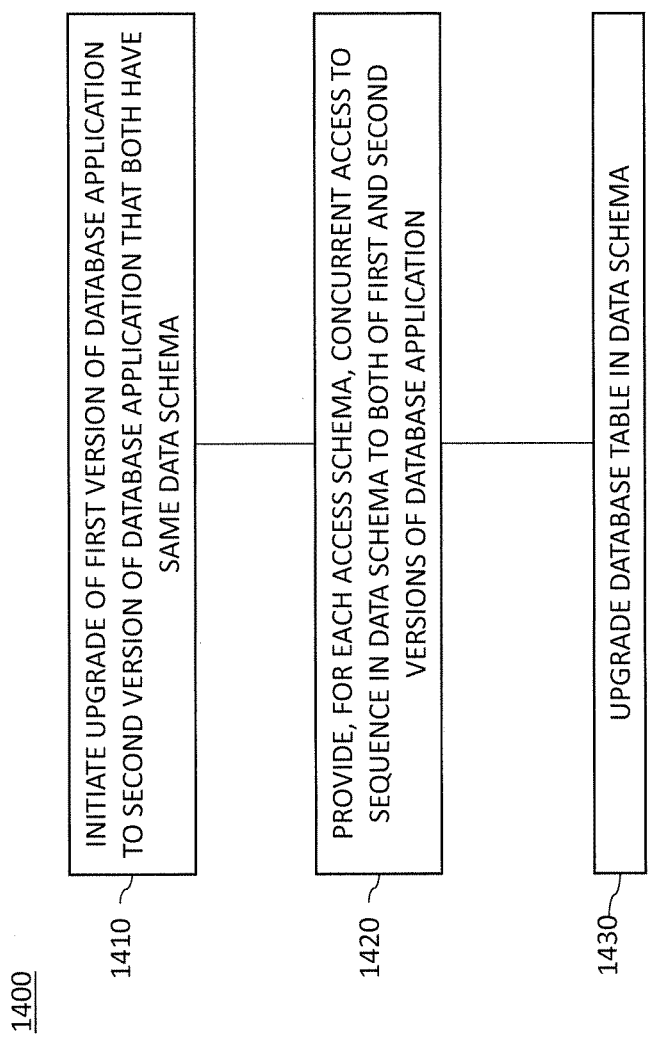
FIG. 14 is a process flow diagram illustrating use of a sequence by multiple access schemas during an upgrade.

FIG. 14 is a process flow diagram 1400 in which, at 1410, an upgrade of a first version of a database application to a second version of a database application that both have a same data schema is initiated. The first database application has a first access schema such that at least one table in the data schema is linked to the first access schema. The second version of the database application has a second access schema such that at least one table in the data schema is linked to the second access schema. The first access schema differs from the second access schema. Subsequently, at 1420, concurrent access is provided for each access schema to a sequence in the data schema to both the first version of the database application and the second version of the database application. Further, optionally, at 630, the at least one database table in the data schema is updated to the second version.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:
    initiating an upgrade of a first version of a database application to a second version of a database application that both have a same data schema, the first database application having a first access schema such that at least one database table in the data schema is linked to the first access schema, the second version of the database application having a second access schema such that the at least one database table in the data schema is linked to the second access schema, the first access schema differing from the second access schema; and
    providing, for each access schema, concurrent access to a sequence in the data schema to both the first version of the database application and the second version of the database application, the sequence being configured to generate, in response to a first call from the first access schema, a first unique value for a first new row of data being inserted into the at least one database table, the sequence being further configured to generate, in response to a second call from the second access schema, a second unique value for a second new row of data being inserted into the at least one database table, the first unique value and the second unique value being generated by at least incrementing a current value of the sequence.

2. The method of claim 1, wherein the concurrent access is enabled by a respective at least one sequence pointer in each of the first access schema and the second access schema.

3. The method of claim 1, wherein the concurrent access is enabled by a field in a respective at least one table in each of the first access schema and the second access schema.

4. The method of claim 3, wherein each of the first access schema and the second access schema includes a table pointer to the at least one database table in the data schema.

5. The method of claim 1 further comprising:
    providing, for each access schema, concurrent access to at least one database table in the data schema to both the first version of the database application and the second version of the database application, the concurrent access being enabled by a respective at least one table link object in each of the first access schema and the second access schema that is used by database views or stored procedures such access schema.

6. The method of claim 5 further comprising:
    updating, using at least one application trigger associated with the at least one table link object, the at least one database table in the data schema to reflect changes in a corresponding table link object.

7. The method of claim 6, wherein there is a first application trigger in the first access schema on the first table link and a second application trigger in the second access schema on a second table link, wherein only the first application trigger is called if the table in the data schema is updated through the first table link object in the first access schema and only the second application trigger is called if the table in the data schema is updated through the second table link object in the second access schema.

8. The method of claim 5, wherein the at least one table link object specifies a select field list of the at least one table in the data schema, wherein the list of fields specified by the table link object is smaller than the list of fields of the table.

9. The method of claim 5, wherein the at least one table link object is used by a database object that cannot use a database view.

10. The method of claim 5, wherein at least one table link object specifies a calculated field.

11. The method of claim 10, wherein the calculated field is transient.

12. The method of claim 5, wherein the at least one table link object references a table in the data schema that specifies a calculated field.

13. The method of claim 1, wherein the database application is executed using an in-memory database system.

14. A system comprising:
    at least one data processor; and
    memory storing instructions which, when executed by the at least one data processor, result in operations comprising:
        initiating an upgrade of a first version of a database application to a second version of a database application that both have a same data schema, the first database application having a first access schema such that at least one database table in the data schema is linked to the first access schema, the second version of the database application having a second access schema such that the at least one database table in the data schema is linked to the second access schema, the first access schema differing from the second access schema; and
        providing, for each access schema, concurrent access to a sequence in the data schema to both the first version of the database application and the second version of the database application, the sequence being configured to generate, in response to a first call from the first access schema, a first unique value for a first new row of data being inserted into the at least one database table, the sequence being further configured to generate, in response to a second call from the second access schema, a second unique value for a second new row of data being inserted into the at least one database table, the first unique value and the second unique value being generated by at least incrementing a current value of the sequence.

15. The system of claim 14, wherein the concurrent access is enabled by a respective at least one sequence pointer in each of the first access schema and the second access schema.

16. The system of claim 14, wherein the concurrent access is enabled by a field in a respective at least one table in each of the first access schema and the second access schema.

17. The system of claim 16, wherein each of the first access schema and the second access schema includes a table pointer to the at least one database table in the data schema.

18. The system of claim 17, wherein the operations further comprise:
    providing, for each access schema, concurrent access to at least one database table in the data schema to both the first version of the database application and the second version of the database application, the concurrent access being enabled by a respective at least one table link object in each of the first access schema and the second access schema that is used by database views or stored procedures such access schema; and updating, using at least one application trigger associated with the at least one table link object, the at least one database table in the data schema to reflect changes in a corresponding table link object.

19. The system of claim 18, wherein there is a first application trigger in the first access schema on the first table link and a second application trigger in the second access schema on a second table link, wherein only the first application trigger is called if the table in the data schema is updated through the first table link object in the first access schema and only the second application trigger is called if the table in the data schema is updated through the second table link object in the second access schema.

20. A non-transitory computer program product storing instructions which, when executed by at least one data processor forming part of at least one computing device, result in operations comprising:

> initiating an upgrade of a first version of a database application to a second version of a database application that both have a same data schema, the first database application having a first access schema such that at least one database table in the data schema is linked to the first access schema, the second version of the database application having a second access schema such that the at least one database table in the data schema is linked to the second access schema, the first access schema differing from the second access schema; and
>
> providing, for each access schema, concurrent access to a sequence in the data schema to both the first version of the database application and the second version of the database application, the sequence being configured to generate, in response to a first call from the first access schema, a first unique value for a first new row of data being inserted into the at least one database table, the sequence being further configured to generate, in response to a second call from the second access schema, a second unique value for a second new row of data being inserted into the at least one database table, the first unique value and the second unique value being generated by at least incrementing a current value of the sequence.

* * * * *